United States Patent
Sylla (10) Patent No.: US 8,713,652 B2
(45) Date of Patent: Apr. 29, 2014

(54) PROTECTING A GAMING MACHINE FROM ROGUE CODE

(75) Inventor: Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 1997 days.

(21) Appl. No.: 11/568,794

(22) PCT Filed: May 5, 2005

(86) PCT No.: PCT/US2005/015844
§ 371 (c)(1),
(2), (4) Date: Nov. 7, 2006

(87) PCT Pub. No.: WO2005/110565
PCT Pub. Date: Nov. 24, 2005

(65) Prior Publication Data
US 2007/0165856 A1    Jul. 19, 2007

Related U.S. Application Data (60) Provisional application No. 60/569,382, filed on May 7, 2004.

(51) Int. Cl.
*G06F 21/31* (2013.01)
(52) U.S. Cl.
USPC ............ 726/6; 713/168; 713/186; 713/187; 713/188; 709/220; 709/223; 705/51; 705/67; 705/80; 463/29; 463/42
(58) Field of Classification Search
CPC ................................ G06F 21/31; G06F 21/10
USPC ............................................................ 726/6
See application file for complete search history.

(56) References Cited

U.S. PATENT DOCUMENTS

| | | | | |
|---|---|---|---|---|
| 5,113,442 | A | * | 5/1992 | Moir .............................. 713/167 |
| 5,339,403 | A | | 8/1994 | Parker |
| 5,398,932 | A | * | 3/1995 | Eberhardt et al. .............. 463/29 |
| 5,417,424 | A | * | 5/1995 | Snowden et al. ............... 463/18 |
| 5,748,890 | A | | 5/1998 | Goldberg et al. |
| 5,851,149 | A | * | 12/1998 | Xidos et al. ..................... 463/42 |
| 6,997,803 | B2 | * | 2/2006 | LeMay et al. ................... 463/20 |
| 7,179,170 | B2 | * | 2/2007 | Martinek et al. ................ 463/29 |
| 7,316,609 | B2 | * | 1/2008 | Dunn et al. ..................... 463/16 |
| 7,470,182 | B2 | * | 12/2008 | Martinek et al. ................ 463/16 |
| 7,559,837 | B1 | * | 7/2009 | Yoseloff et al. ................. 463/21 |
| 7,708,640 | B2 | * | 5/2010 | Burak et al. .................... 463/30 |
| 2002/0116615 | A1 | * | 8/2002 | Nguyen et al. ................ 713/168 |
| 2002/0142831 | A1 | * | 10/2002 | Mattice et al. .................. 463/29 |

(Continued)

OTHER PUBLICATIONS

Computer Game Criticism|http://andrey.savelyev.2009.homepage.auditory.ru/2006/Ivan.Ignatyev/DiGRA/Computer%20Game%20Criticism_A%20Method%20for%20Computer%20Game%20Analysis.pdf|Lars Konzack|2002|pp. 89-100.*

(Continued)

*Primary Examiner* — Mahfuzur Rahman
(74) *Attorney, Agent, or Firm* — Nixon Peabody LLP (57) ABSTRACT

Systems and methods provide a gaming machine that is protected from the introduction of rogue code. One aspect of the systems and methods includes disabling a user access feature, such as a login or network access feature of an operating system executing on the gaming machine. A further aspect of the systems and methods includes removing debuggers and debugging information from an operating system or application executing on the gaming machine.

18 Claims, 5 Drawing Sheets

(56) References Cited

U.S. PATENT DOCUMENTS

| | | | |
|---|---|---|---|
| 2003/0069074 A1* | 4/2003 | Jackson | 463/43 |
| 2003/0134675 A1* | 7/2003 | Oberberger | 463/29 |
| 2003/0228910 A1* | 12/2003 | Jawaharlal et al. | 463/42 |
| 2004/0204243 A1* | 10/2004 | de Mello Costa | 463/42 |
| 2004/0266533 A1* | 12/2004 | Gentles et al. | 463/42 |
| 2007/0234030 A1* | 10/2007 | Lu | 713/2 |
| 2009/0253487 A1* | 10/2009 | Gagner et al. | 463/20 |
| 2010/0130280 A1* | 5/2010 | Arezina et al. | 463/20 |

OTHER PUBLICATIONS

"International Search Report for Application No. PCT/US2005/015844, date mailed Jul. 13, 2006", 4 pgs.

"Written Opinion of the International Searching Authority for Application No. PCT/US2005/015844, date mailed Jul. 13, 2006", 6 pgs.

* cited by examiner

PROTECTING A GAMING MACHINE FROM ROGUE CODE

RELATED APPLICATION

This application is a U.S. National Stage Filing under 35 U.S.C. 371 from International Patent Application Serial No. PCT/US2005/015844, filed May 5, 2005, and published on Nov. 24, 2005 as WO 2005/110565 A2,which claims the benefit of U.S. Provisional Application Ser. No. 60/569,382 filed May 7, 2004, which applications are incorporated herein by reference.

FIELD

The present invention relates generally to software for gaming machines, and more particularly to protecting such software from the introduction of rogue code.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto:
Copyright ® 2003, WMS Gaming, Inc. All Rights Reserved.

BACKGROUND

Today's gaming terminal typically comprises a computerized system controlling a video display or reels that provide wagering games such as slots, video card games (poker, blackjack etc.), video keno, video bingo, video pachinko and other games typical in the gaming industry. In past systems, the software controlling the computerized system has been primarily proprietary software, including both the operating system and gaming software.

Open (i.e. non-proprietary) operating systems such as Linux and to a certain extent other UNIX based operating systems have been regarded as providing several benefits to developing computerized gaming systems. For example, there are more people skilled in developing software for open operating systems and typically a newly hired developer does not need to be trained in the workings of the operating system as is typically the case with a proprietary operating system. As a result, there is a larger pool of developers skilled in workings of open operating systems and skilled in developing applications for open operating systems.

Additionally, many software development tools are available for open operating systems. This is not typically the case with a proprietary operating system where development tools must generally be custom made for the proprietary operating system.

Also, there has been increased interest in providing gaming machines that may be communicably coupled to a network. Providing a network attached gaming machine has the advantage that software on the gaming machine can be easily updated from a server that may be remote from the machine's location. Additionally, data from the gaming machine can be uploaded to back-end systems such as accounting systems that track the usage of the machine. Open operating systems typically provide industry standard network protocols, making it unnecessary to develop networking software as would be the case for a proprietary operating system.

However, the same qualities that make open operating systems desirable for development raise concerns in other areas. For example, because many people are familiar with the workings of open operating systems, there are also many people that are familiar with the security weaknesses of open operating systems. Additionally, the same development tools that are used to develop software such as debuggers, compilers and code modeling tools can be used to reverse engineer software developed for an open operating system.

Security is a particular concern in the gaming industry. Gaming machine providers need to satisfy various regulatory bodies in various jurisdictions that the gaming machines are secure against attempts to unfairly manipulate the outcome of a game on a gaming machine. Attempts to manipulate the outcome may come in the form of replacing or supplementing known authorized software with unauthorized "rogue" software. Additionally, attempts to manipulate the outcome may come in the form of reverse engineering authorized software in an attempt to learn the algorithms used to generate a gaming result.

In view of the above mentioned problems and concerns, there is a need in the art for the present invention.

SUMMARY

The above-mentioned shortcomings, disadvantages and problems are addressed by the present invention, which will be understood by reading and studying the following specification.

One aspect of the systems and methods of the inventive subject matter includes disabling a user access feature, such as a login or network access feature of an operating system executing on the gaming machine. A further aspect of the systems and methods includes removing debuggers and debugging information from an operating system or application executing on the gaming machine.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
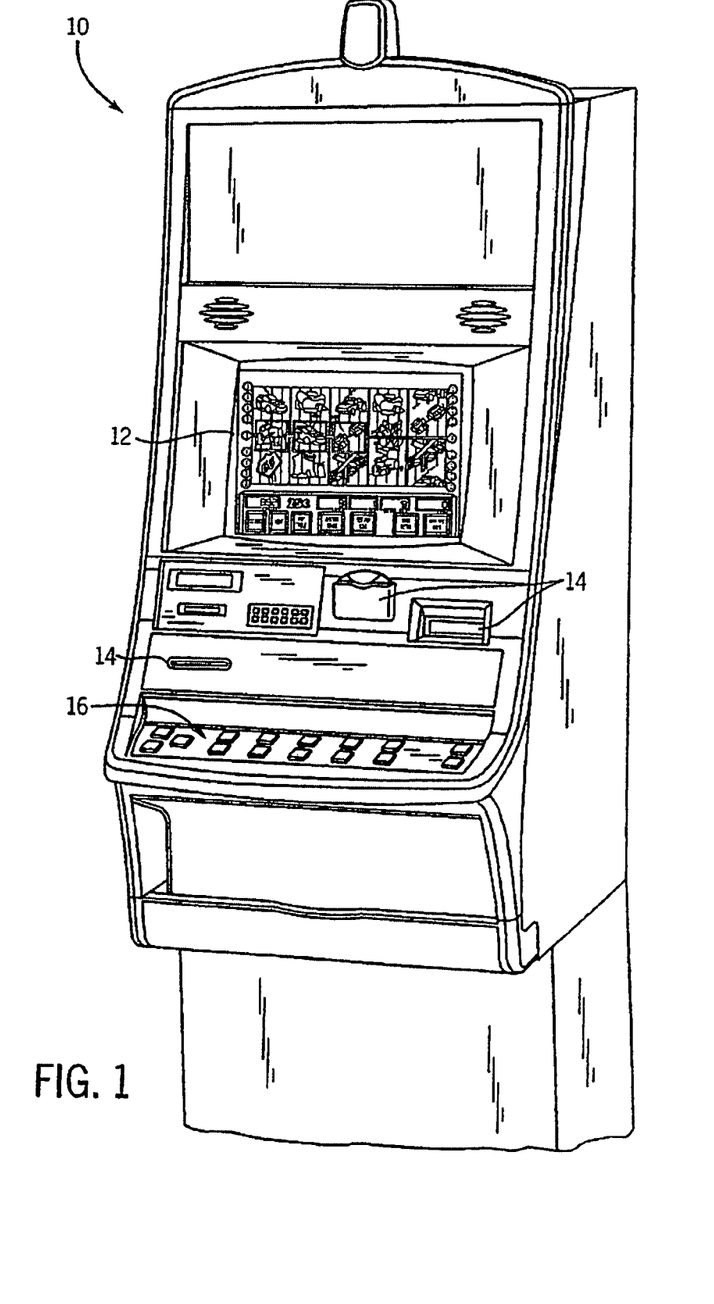
FIG. 1 is a perspective view of a gaming machine embodying the present invention.

FIG. 1 illustrates an exemplary gaming machine 10 in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the pushbuttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2:
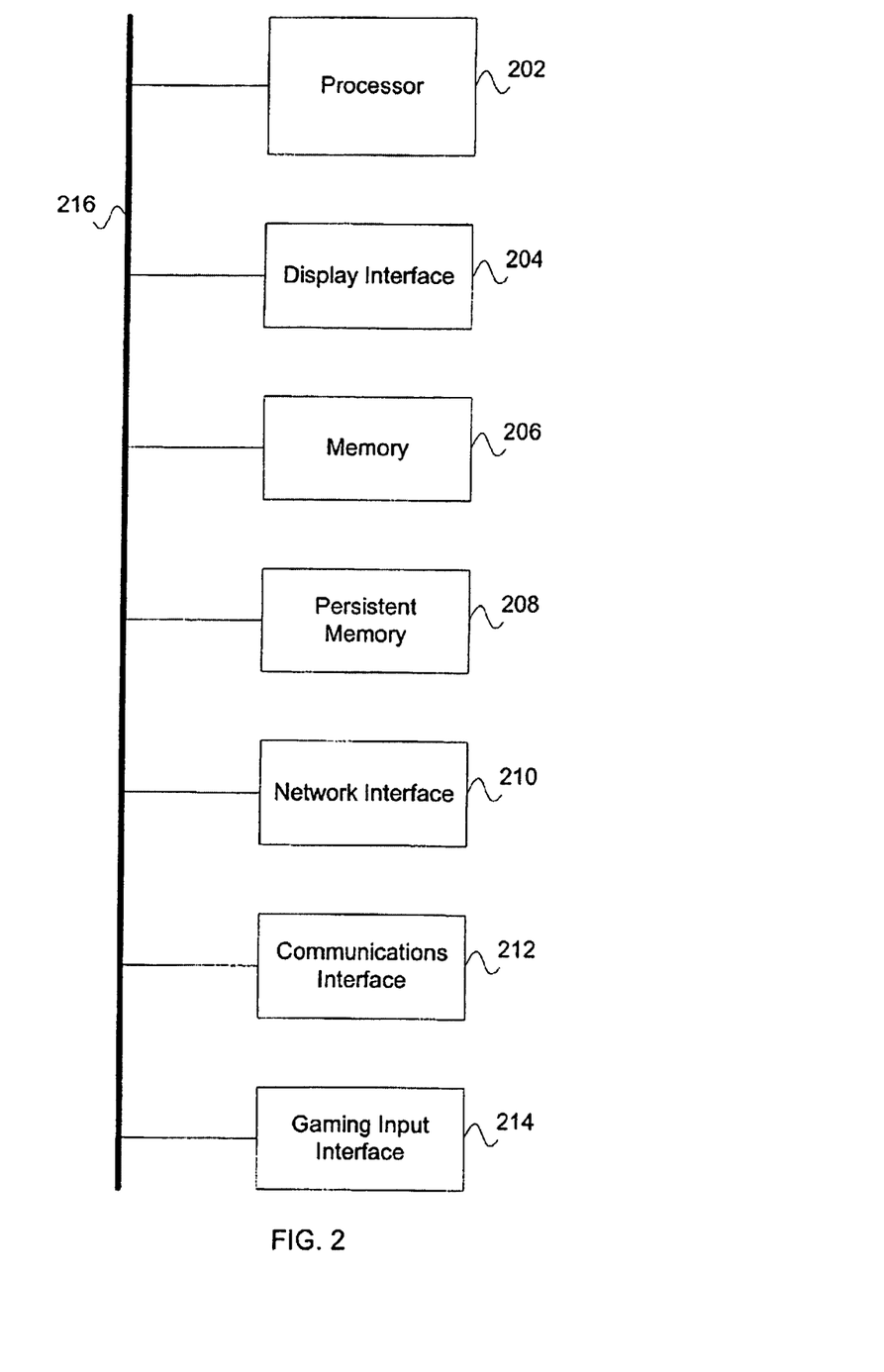
FIG. 2 is a block diagram of a gaming control system suitable for operating the gaming machine in FIG. 1.

FIG. 2 is a block diagram of a gaming control system 200 suitable for controlling the operation of the gaming machine 10 in FIG. 1. In some embodiments of the invention, gaming control system 200 includes one or more processors 202, one or more displays 204, memory 206, persistent memory 208, network interface 210, communications interface 212, gaming input interface 214 all communicably coupled via a bus 214 Processor 202 executes operating system and gaming software stored in memories 206 and 208. In some embodiments, processor 202 may be a processor from the Intel Pentium® family of processors, however the invention is not limited to any particular processor. Memory 206 may be a random-access memory capable of storing instructions and data used by an operating system and gaming application.

Persistent memory 208 is a memory that may be used to store operating system and gaming software for loading and execution by processor 202. Persistent memory 208 may be a ROM, a flash memory, a hard drive, a CD-ROM, DVD-ROM or other type of memory able to persistently store software and data.

Display interface 204 operates to control one or more displays such as display 12 of gaming machine 10.

Figure 3:
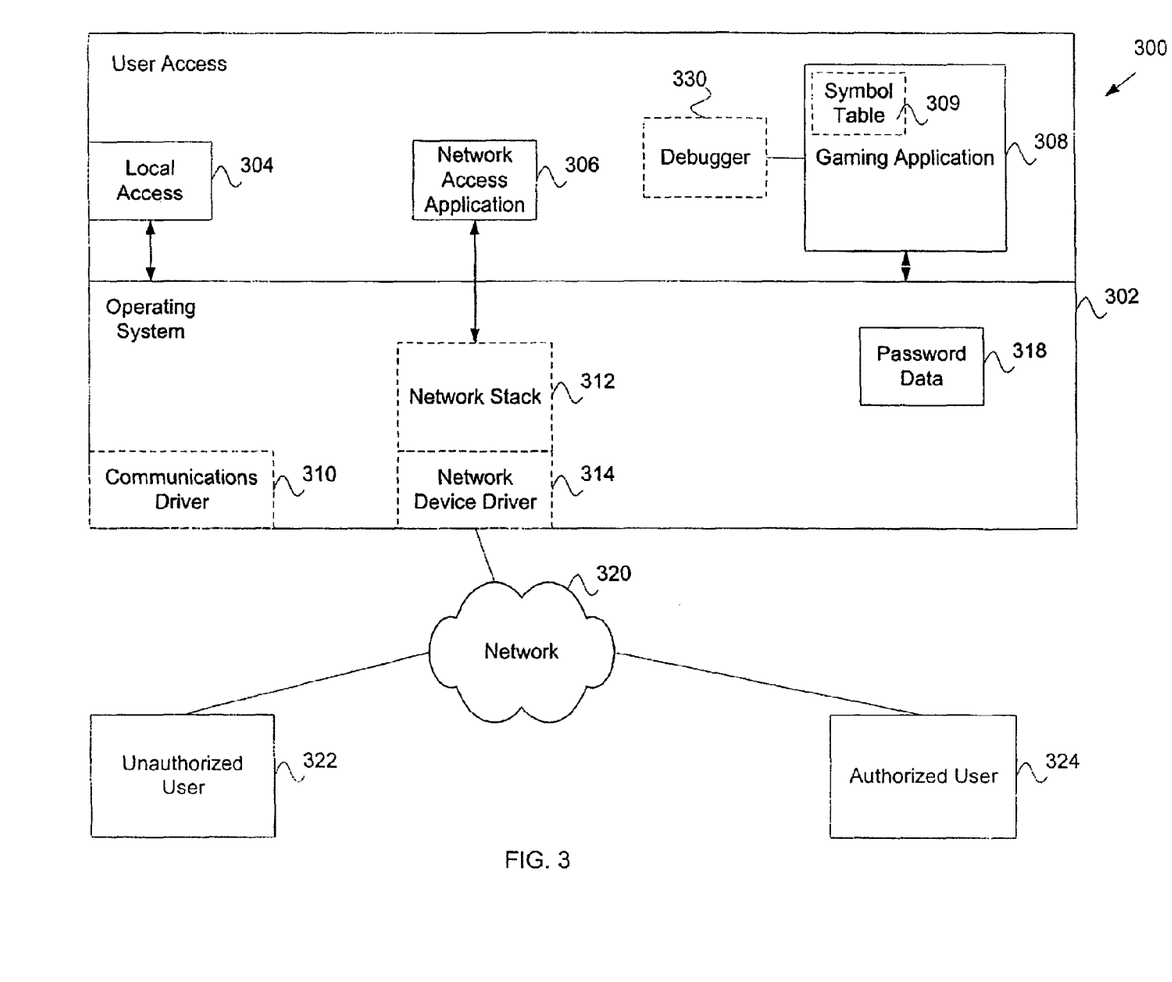
FIG. 3 is a block diagram of a software environment for a gaming control system suitable for operating the gaming machine in FIG. 1.

FIG. 3 is a block diagram of a software environment for a gaming control system suitable for operating the gaming machine 10 in FIG. 1 by gaming control system 200 in FIG. 2. As illustrated in FIG. 3, some components in the software environment are executed within the context of an operating system kernel 302 while other components are executed at the user level. In varying embodiments, operating system 302 may be a version of the UNIX operating system, the LINUX operating system, or a version of the Microsoft Windows family of operating systems.

Among the components typically executed within the context of the operating system are drivers such as communications driver 310 and network device driver 314. Communications driver 310 typically provides an interface between communications hardware such as RS232 ports, parallel ports and other types of communications devices that may be used to enable the gaming device to send and receive data from peripherals such as terminals and printers that may be coupled to the gaming device. Network device driver 314 typically provides an interface between the software of the operating system and a networking device capable of communicably coupling the gaming machine to a network 320. In some embodiments, network 320 is a wired or wireless Ethernet based network, and network device driver 314 provides a communications interface providing the ability for software to send and receive data over the network 320. However, other types of networks and network devices are within the scope of the inventive subject matter.

Network stack 312 comprises a layered interface providing a standardized interface for applications and other software components desiring to communicate over network 320. In some embodiments, network stack 312 is a TCP/IP (Transmission Control Protocol/Internet Protocol) stack. However, other network stacks and protocols may be substituted and are within the scope of the inventive subject matter.

User access components include local access components 304, network access application 306, debugger 330, and gaming application 308. Other user level components may exist in the software environment, however those components not required for understanding the operation of the various embodiments of the invention will be omitted to avoid obscuring the discussion.

Local access component 304 comprises software components that provide access to the gaming device software through a device such as a console port for a user that is physically proximate to the gaming device. Such local access components include login programs that prompt a user for a userid/password combination before allowing access to the software environment. In some embodiments, valid userid/password combinations are maintained by the operating system as password data 318.

Network access applications 306 comprise applications that provide access to the gaming device's software environment over a network 320. Such applications include but are not limited to remote login applications such as telnet and rlogin; and file transfer applications such as FTP (File Transfer Protocol), TFTP (Trivial File Transfer Protocol) and rcp (remote copy). Those of skill in the art will appreciate that a variety of such network access applications exist and are within the scope of the inventive subject matter. Network access applications are typically provided to allow authorized users 324 to access the applications and data on the gaming machine from remote locations. Unfortunately, network access to the gaming machine also provides an opportunity for unauthorized users 322 to attempt to access the software and data on the gaming machine.

In some embodiments, software environment 300 includes a debugger 330 for a gaming application. Debuggers provide the ability to monitor and control the execution of a debugged application such as a gaming application 308. Debuggers frequently include the ability to display currently executing code, set breakpoints in the code, examine memory locations for variables, and alter memory locations. Often the debugger will use a symbol table 309 generated by the compiler or linker used to create application 308 in order to determine where in memory variables and functions reside.

Application 308 may be any type of application executable on a gaming device, including applications providing slots, poker, keno, bingo, or blackjack games on the gaming device.

Figure 4A:
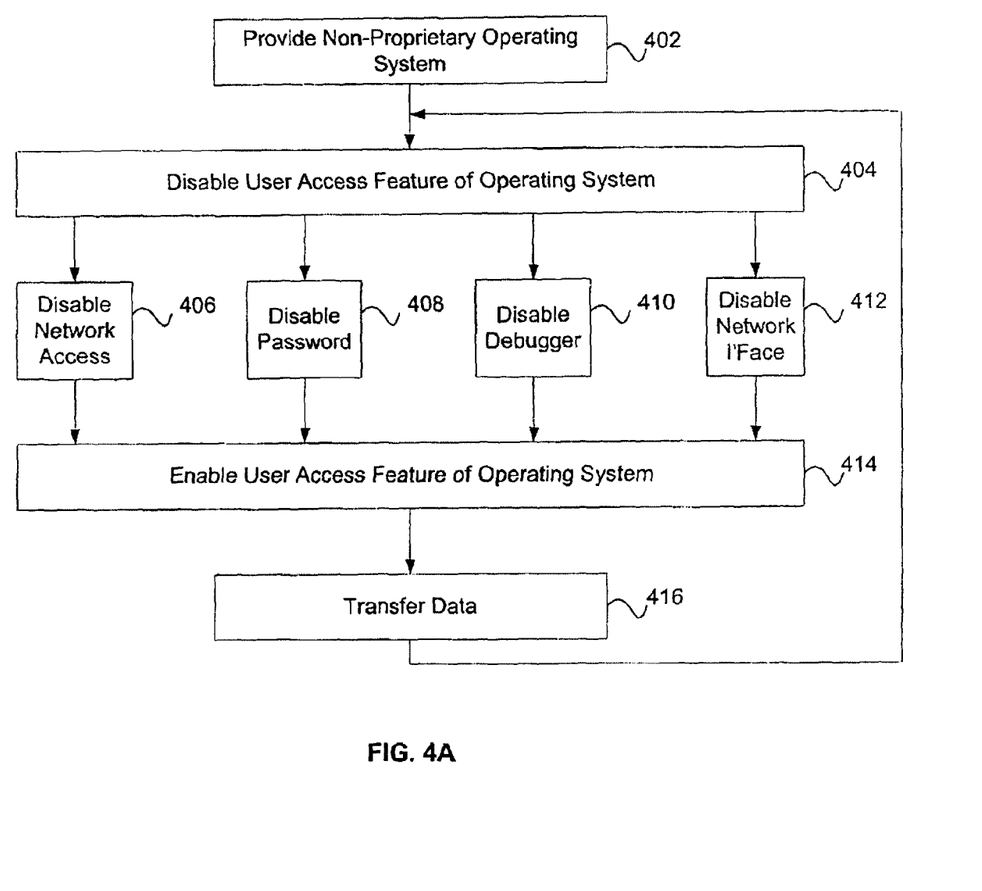
FIGS. 4A-B are flowcharts illustrating methods for securing a gaming machine from external attempts to manipulate the outcome of the gaming machine.
Figure 4B:
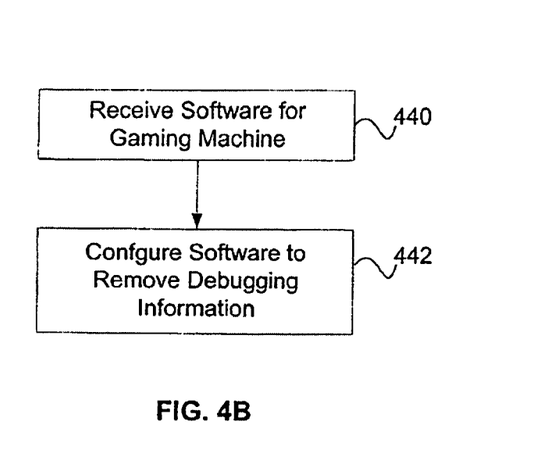

FIGS. 4A-B are flowcharts illustrating methods for securing a gaming machine from external attempts to manipulate the outcome of the gaming machine according to an embodiment of the invention. The methods to be performed by the operating environment executing on a gaming machine and may constitute at least in part computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 4A-4B are inclusive of acts that may be taken by an operating environment executing an exemplary embodiment of the invention.

FIG. 4A illustrates a method for protecting a gaming machine from rogue code (i.e. unauthorized software). The method begins by providing a non-proprietary operating system on a gaming machine (block 402). In some embodiments, the non-proprietary operating system is a version of a LINUX operating system. In alternative embodiments, the non-proprietary operating system is a version of a UNIX based operating system.

The method then disables at least one user access feature of the operating system (block 404). Various user access features may be disabled in differing combinations. For example, in some embodiments a network access feature is disabled (block 406). As noted above, such network access features include remote access applications such as telnet and rlogin, and also include file transfer applications such as FTP, TFTP and rcp.

In alternative embodiments of the invention, one or more passwords associated with one or more user identifications may be disabled (block 408). In some embodiments, a root password (or other "privileged" userid) password is disabled. Methods of disabling a userid/password include setting the encrypted value of the password to a value than cannot be decrypted using the operating systems encryption/decryption software, removing the password entry from a password file or database, or removing entirely the password file or database.

In further alternative embodiments, a debugger is disabled in the operating environment (block 410). Various mechanisms exist to disable a debugger. For example, the debugger may be removed from the operating environment, the execution permissions of the debugger may be set such that the debugger is not executable by any user (including privileged users), or the debugger code may be intentionally corrupted.

In still further alternative embodiments, a network interface may be disabled (block 412). Examples of disabling a network interface include configuring the operating system such that the driver or network stack is not included, removing the driver and/or network stack from the operating system, or using operating system configuration software to disable the network driver or network stack. In addition, the network interface hardware may be physically disabled by decoupling it from the gaming machine.

It should be noted that any combination of one or more of blocks 406-412 may be used to prevent rogue code from being introduced on a gaming machine, the inventive subject matter is not limited to any particular combination or ordering for blocks 406-412.

In some embodiments of the invention, a user access feature may be enabled (temporarily) in order to allow authorized code or data to be communicated to or from the gaming machine (block 414). In some embodiments, an authorized user with physical access to the gaming machine may re-enable a user access feature in order to allow remote access to the machine. Once remote access has been enabled, a remote authorized user may transfer data to or from the gaming machine (block 416). Such data may include executable software to be executed on the gaming machine.

FIG. 4B illustrates a method for protecting a gaming machine from rogue code. The method begins by receiving software on the gaming machine (block 440). The software may be received as part of an initial configuration for the gaming machine or it may be received at a later time through a software download process.

Additionally, the software is configured such that the debugging information is removed from the software (block 442). Typically such debugging information comprises a symbol table providing a map to the memory locations for functions and variables used reference in the source code for the software. Various mechanisms may be used to remove the debugging information. For example, a 'strip' command may be used after an application has been compiled and linked to remove symbol table information. Additionally, the compiler or linker may be configured to remove, or not generate, symbol table information. In these embodiments, the symbol table information may be removed prior to being received by the gaming machine. Removing the symbol table information is desirable, because it makes reverse engineering the software more difficult.

Conclusion

Systems and methods for protecting a gaming device from the introduction of rogue code have been disclosed. The systems and methods described provide advantages over previous systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for protecting network-attached gaming machines by isolating a gaming machine the method comprising:
providing an operating system for use on a controller of the gaming machine;
providing a wagering game controlled by the operating system and operable to receive a wager of monetary value and to generate a game outcome;
recognizing unauthorized attempts by rogue code to manipulate the game outcome of the wagering game; and
securing, by the operating system, the gaming machine from recognized unauthorized attempts to manipulate the game outcome of the wagering game by the rogue code by:
isolating the gaming machine from other gaming machines by disabling a network access feature of the operating system, the disabling including disabling a network interface of the operating system and removing at least one transport layer of a network stack from the gaming machine; and
removing debugging information from the wagering game controlled by the operating system, the debugging information including a symbol table, wherein the symbol table maps functions and variables of the wagering game to memory locations of the gaming machine.

2. The method of claim 1, wherein manipulating the game outcome includes an unauthorized user attempting to access the software on the gaming machine.

3. The method of claim 1, wherein disabling a network access feature comprises removing a remote login component from the gaming machine.

4. The method of claim 3, wherein the remote login component is a telnet component.

5. The method of claim 3, wherein the remote login component is a rlogin component.

6. The method of claim 1, wherein recognizing an attempt to manipulate the game outcome includes detecting an invalid userid entered into a login program.

7. The method of claim 1, wherein recognizing an attempt to manipulate the game outcome includes detecting an invalid password entered into a login program.

8. The method of claim 1, wherein disabling the network access feature of the operating system comprises setting a password entry to an invalid password.

9. The method of claim 8, wherein the password entry corresponds to a privileged user.

10. The method of claim 1, wherein the operating system is a non-proprietary operating system.

11. The method of claim 10, wherein the non-proprietary operating system is a version of a Linux operating system.

12. The method of claim 1, wherein disabling the network access feature of the operating system comprises disabling a network device driver of the operating system.

13. The method of claim 1, wherein disabling the network interface comprises disabling an Ethernet interface.

14. The method of claim 1, further comprising:
temporarily enabling the network access feature;
transferring data to the gaming machine using the network access feature; and
disabling the network access feature again after transferring the data.

15. A computer readable, non-transitory medium having executable computer program code to perform the method of claim 1 when said computer program code is run on a computer.

16. A method for protecting gaming machine software operating on a gaming machine controller, the method comprising:
providing an operating system for use on the gaming machine controller, the operating system being a version of a Linux non-proprietary operating system;
receiving the gamine machine software for execution on the gaming machine controller and controlled by the operating system;
configuring the gaming machine software to conduct a wagering game on the gaming machine to receive a wager of monetary value and to generate a game outcome;
recognizing unauthorized attempts by rogue code to manipulate the game outcome of the wagering game; and
securing the wagering game from unauthorized manipulations of the game outcome of the wagering game by the rogue code by:
isolating the gaming machine from other gaming machines by disabling a network access feature of the operating system, the disabling including disabling a network device driver; and
removing debugging information from the wagering game controlled by the operating system, the debugging information including a symbol table, wherein the symbol table maps functions and variables of the wagering game to memory locations of the gaming machine.

17. The method of claim 16, wherein disabling the network access feature of the operating system comprises disabling a network interface.

18. A gaming machine comprising:
a controller;
a storage device with an operating system and gaming software stored thereon;
one or more processors, the one or processors configured to execute the operating system and gaming software to perform operations comprising:
executing a wagering game controlled by the operating system and operable to receive a wager of monetary value and to generate a game outcome;
recognizing unauthorized attempts by rogue code to manipulate the game outcome of the wagering game; and
securing, by the operating system, the gaming machine from recognized unauthorized attempts to manipulate the game outcome of the wagering game by the rogue code by:
isolating the gaming machine from other gaming machines by disabling a network access feature of the operating system, the disabling including disabling a network interface of the operating system and removing at least one transport layer of a network stack from the gaming machine; and
removing debugging information from the wagering game controlled by the operating system, the debugging information including a symbol table, wherein
the symbol table maps functions and variables of the wagering game to memory locations of the gaming machine.

* * * * *

UNITED STATES PATENT AND TRADEMARK OFFICE
CERTIFICATE OF CORRECTION

PATENT NO.        : 8,713,652 B2
APPLICATION NO.   : 11/568794
DATED             : April 29, 2014
INVENTOR(S)       : Craig J. Sylla Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2121 days.

Signed and Sealed this

Twenty-ninth Day of September, 2015

Michelle K. Lee
*Director of the United States Patent and Trademark Office*